(12) United States Patent
Reamer

(10) Patent No.: US 11,959,053 B1
(45) Date of Patent: Apr. 16, 2024

(54) APPARATUS AND METHOD FOR THE SEPARATION OF JUICE FROM PULP

(71) Applicant: James Reamer, Clarksburg, CA (US)

(72) Inventor: James Reamer, Clarksburg, CA (US)

( * ) Notice: Subject to any disclaimer, the term of this patent is extended or adjusted under 35 U.S.C. 154(b) by 1073 days.

(21) Appl. No.: 16/732,986

(22) Filed: Jan. 2, 2020

(51) Int. Cl.
*C12G 1/00* (2019.01)
*A01D 46/28* (2006.01)
*A23N 1/00* (2006.01)

(52) U.S. Cl.
CPC ............... *C12G 1/005* (2013.01); *A23N 1/00* (2013.01); *A01D 46/28* (2013.01)

(58) Field of Classification Search
CPC .......... C12G 1/005; A01D 46/28; A23N 1/00
USPC ....................................................... 99/495
See application file for complete search history.

(56) References Cited

U.S. PATENT DOCUMENTS

| | | | | |
|---|---|---|---|---|
| 2,009,123 A * | 7/1935 | Victor | ...................... | A47J 43/22 4/290 |
| 2,068,013 A * | 1/1937 | Fridlender | ............... | A23N 1/00 100/96 |
| 2,386,881 A * | 10/1945 | Phillips | .................. | A01D 46/00 198/312 |
| 2,398,978 A * | 4/1946 | Udell | ....................... | A47J 36/08 210/469 |
| 3,233,396 A * | 2/1966 | Gallo | .................... | A01D 46/005 426/809 |
| 3,478,796 A * | 11/1969 | Rafanelli | ............. | A23N 15/025 99/495 |
| 3,714,887 A * | 2/1973 | Johnson | .................... | A23N 1/02 99/485 |
| 3,730,443 A * | 5/1973 | Johnson | ................. | A01D 46/00 56/330 |
| 3,900,571 A * | 8/1975 | Johnson | ................. | A01D 46/00 426/333 |
| 3,910,837 A * | 10/1975 | Good | ......................... | B03B 7/00 299/9 |
| 3,941,690 A * | 3/1976 | Powers | ..................... | B03B 5/26 209/44 |
| 4,119,542 A * | 10/1978 | Yamaoka | ................. | A23N 1/00 210/360.2 |
| 4,157,062 A * | 6/1979 | Ackeret | ................ | A47J 19/023 99/503 |
| 4,223,688 A * | 9/1980 | Nylund | .................. | A23N 15/00 134/79 |
| 4,253,390 A * | 3/1981 | Hunt | ....................... | B30B 9/163 99/638 |
| 4,266,473 A * | 5/1981 | Hunt | ....................... | B30B 9/12 100/193 |
| 4,339,043 A * | 7/1982 | Tice | ......................... | B07B 1/22 209/451 |
| 4,472,269 A * | 9/1984 | Swick | ...................... | B03B 7/00 209/490 |
| 4,525,270 A * | 6/1985 | McCann | .................. | B03B 7/00 209/202 |

(Continued)

*Primary Examiner* — Eric S Stapleton
(74) *Attorney, Agent, or Firm* — Steven R. Vosen

(57) ABSTRACT

An apparatus and method are described for the separation of juice from pulp which is useful in the making of wine. The apparatus includes a bin and insert that are rotatably connected, by a hinge, for example. In certain embodiments, the insert is a shelf with a drain that separates the juice from the pulp. The method includes providing a mixture of pulp and juice to a transport bin. The pulp and juice are separated and stored separately in the bin, and are unloaded at the same time.

7 Claims, 2 Drawing Sheets

(56) References Cited

U.S. PATENT DOCUMENTS

| | | | | |
|---|---|---|---|---|
| 4,592,833 A * | 6/1986 | Perdue | B03B 7/00 | |
| | | | 209/44 | |
| 5,031,524 A * | 7/1991 | Wettlaufer | A23N 1/00 | |
| | | | 100/130 | |
| 5,927,509 A * | 7/1999 | Lord | B03B 5/02 | |
| | | | 209/44 | |
| 6,041,940 A * | 3/2000 | Owings | B03B 5/26 | |
| | | | 209/490 | |
| 6,135,019 A * | 10/2000 | Chou | A47J 43/0716 | |
| | | | 366/205 | |
| 6,539,848 B2 * | 4/2003 | Wang | A47J 19/023 | |
| | | | 99/506 | |
| 6,793,826 B1 * | 9/2004 | Barth | C12F 3/06 | |
| | | | 210/85 | |
| 9,095,881 B2 * | 8/2015 | Rieck | B07B 1/02 | |
| 9,174,240 B1 * | 11/2015 | Wilson | B03B 5/56 | |
| 10,010,910 B1 * | 7/2018 | Stover | B07B 1/02 | |
| 10,758,940 B1 * | 9/2020 | Young | B07B 1/02 | |
| 2001/0001676 A1 * | 5/2001 | O'Reilly | C12H 1/0424 | |
| | | | 426/442 | |
| 2003/0005832 A1 * | 1/2003 | Wang | A47J 19/023 | |
| | | | 99/508 | |
| 2005/0081723 A1 * | 4/2005 | Lin | A47J 19/023 | |
| | | | 99/501 | |
| 2005/0284309 A1 * | 12/2005 | de Groote | A47J 17/18 | |
| | | | 99/508 | |
| 2006/0065767 A1 * | 3/2006 | Lin | A47J 19/027 | |
| | | | 241/74 | |
| 2007/0074630 A1 * | 4/2007 | Mengual | A47J 19/023 | |
| | | | 99/495 | |
| 2007/0104842 A1 * | 5/2007 | Margolis | A23N 4/10 | |
| | | | 426/484 | |
| 2007/0107608 A1 * | 5/2007 | Holcomb | A47J 19/023 | |
| | | | 99/495 | |
| 2007/0125244 A1 * | 6/2007 | Hensel | A47J 19/025 | |
| | | | 99/501 | |
| 2009/0056297 A1 * | 3/2009 | Pellenc | A23N 15/02 | |
| | | | 56/16.5 | |
| 2009/0229478 A1 * | 9/2009 | Wu | B01D 21/26 | |
| | | | 210/512.1 | |
| 2011/0083566 A1 * | 4/2011 | Backus | A23N 1/003 | |
| | | | 241/37.5 | |
| 2012/0093988 A1 * | 4/2012 | Frati | C12G 1/005 | |
| | | | 99/468 | |
| 2012/0103203 A1 * | 5/2012 | Hensel | A47J 19/023 | |
| | | | 99/504 | |
| 2013/0255511 A1 * | 10/2013 | Steiner | A47J 19/027 | |
| | | | 99/513 | |
| 2014/0030393 A1 * | 1/2014 | Suter | A23N 1/003 | |
| | | | 426/231 | |
| 2014/0170263 A1 * | 6/2014 | Loos | B01F 35/3202 | |
| | | | 426/15 | |
| 2014/0190874 A1 * | 7/2014 | Rieck | B07B 1/02 | |
| | | | 209/364 | |
| 2015/0140166 A1 * | 5/2015 | Escudier | C12G 1/0213 | |
| | | | 426/15 | |
| 2015/0336134 A1 * | 11/2015 | Rieck | B07B 1/02 | |
| | | | 209/328 | |
| 2016/0325314 A1 * | 11/2016 | Harpel | B65B 1/06 | |
| 2017/0065911 A1 * | 3/2017 | Schneider | A47L 13/50 | |
| 2020/0147645 A1 * | 5/2020 | Goosen | B07B 1/06 | |
| 2021/0292689 A1 * | 9/2021 | Belli | B66F 9/125 | |

* cited by examiner

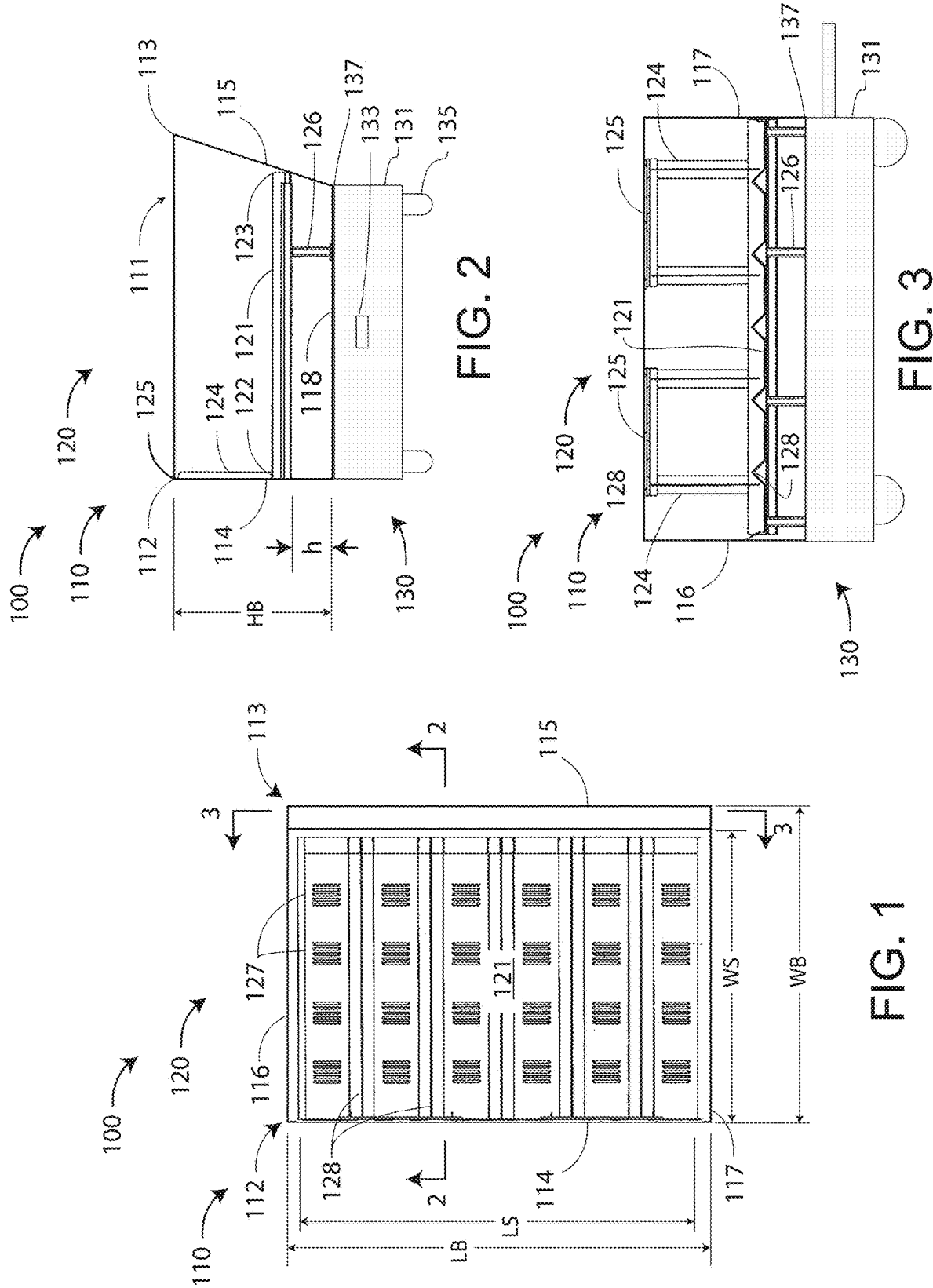

APPARATUS AND METHOD FOR THE SEPARATION OF JUICE FROM PULP

BACKGROUND OF THE INVENTION

Field of the Invention

The present invention generally relates to the winemaking, and more particularly to an apparatus and method for separating grape juice from pulp.

Discussion of the Background

The flavor and composition of wine depends, in part, on the relative amount of pulp and juice that are fermented in the wine-making process. For some types of wines, fermentation of a mixture of juice and pulp is advantageous, while for other types of wines, it is advantageous to ferment primarily juice.

After harvesting, grapes are typically transported to a winery in a grape transport bin. During harvesting, grape skins can be damaged, resulting in a mixture of pulp and juice in the grape transport bin. Depending on the type of wine being produced, the consistency and/or color of the wine can be affected by contact of the pulp and juice prior to fermenting.

There is a need in the art for a method and apparatus that reduces the amount of time that pulp and juice are mixed together during transport from the field to the winery. Such a method and apparatus should be compatible with current practices.

BRIEF SUMMARY OF THE INVENTION

The present invention overcomes the disadvantages of prior art by providing an apparatus and method that facilitates the separation of pulp from juice during the transport of harvested grapes in a transport bin.

It is one aspect of the present invention to provide a bin for the separation of juice from pulp. The apparatus includes a container and an insert. The container has a bottom and sides including a proximal side with a proximal top edge and a distal side with a distal top edge, and an opening defined in part by the proximal top edge and the distal top edge. The insert includes a shelf rotatably attached to the container along an axis near the proximal top edge, where the insert extends from an proximal end to an distal end. The bin has: a first configuration wherein the shelf is within the container, where the proximal end is near the proximal side, and where the distal end is near the distal side; a second configuration wherein the bin is rotated from the first configuration along the axis such that the distal end of the shelf protrudes out of the opening; and a third configuration wherein the bin is rotated from the first configuration along the axis such that any material in the container flows from the container through the opening.

It is another aspect of the present invention to provide a method of separating juice from pulp using a bin. The bin includes a container and an inert. The container has a bottom and sides including a proximal side with a proximal top edge and a distal side with a distal top edge, and an opening defined in part by the proximal top edge and the distal top edge. The insert includes a shelf rotatably attached to the container along an axis near the proximal top edge, where the insert extends from an proximal end to an distal end. The bin has: 1) a first configuration wherein the shelf is within the container; and 2) a second configuration wherein the bin is rotated away the first configuration along the axis such, that the distal end of the shelf protrudes out of the opening. The method includes providing juice and pulp to the shelf with the bin in the first configuration, such that the pulp remains on the shelf and the juice is separated from the pulp to a bin location below the shelf; and unloading the bin by rotating the bin along an axis parallel to the shelf to the second configuration, such that the pulp and the juice exits the opening.

These features together with the various ancillary provisions and features which will become apparent to those skilled in the art from the following detailed description, are attained by the apparatus and method of the present invention, preferred embodiments thereof being shown with reference to the accompanying drawings, by way of example only, wherein:

BRIEF DESCRIPTION OF THE SEVERAL VIEWS OF THE DRAWING

FIG. 1 is a top view of an embodiment of a bin;
FIG. 2 is a sectional view 2-2 of the bin of FIG. 1;
FIG. 3 is a sectional view 3-3 of the bin of FIG. 1.

Figure 4A:
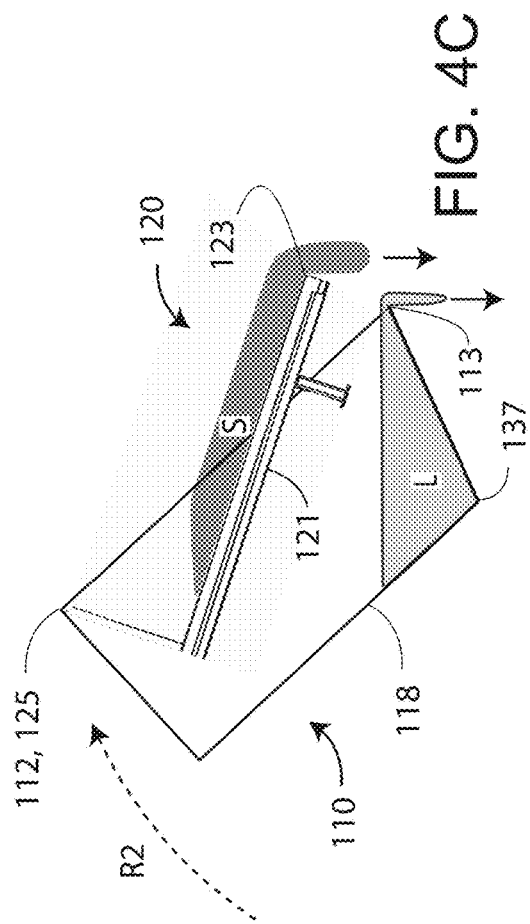
FIG. 4A is a sectional view 2-2 showing the bin loaded with grapes.

Reference symbols are used in the Figures to indicate certain components, aspects or features shown therein, with reference symbols common to more than one Figure indicating like components, aspects or features shown therein.

DETAILED DESCRIPTION OF THE INVENTION

FIGS. 1, 2, and 3 are, respective, a top view of an embodiment of a bin 100, a sectional view 2-2 of the FIG. 1, and a sectional view 3-3 of FIG. 1. Bin 100 includes a container 110 and an insert 120. Container 110 has sides 114, 115, 116 and 117 that extend from a container bottom 118 to an opening 111 that is partially defined by a first container edge 112 of side 114 and a second container edge 113 of side 115. In certain embodiments, bin 100 has a height that is, for example and without limitation HB=45 inches, a length. that is, for example and without limitation, LB=10 feet. 4 inches, and a width, that is, for example and without limitation, WB=8 feet. 2 inches.

Insert 120 is sized to fit in container 110 and includes a shelf 121 that extends from a first edge 122 to an opposing second edge 123, arms 124 that extend from first edge 122 to hinges 125, and legs 126. Hinges 125 are attached to first container edge 112 to allow insert 120 to rotate out of container 110 through opening 111. Legs 126 have a length, h, which provide a spacing between shelf 121 and container bottom 118. Shelf 121 includes a plurality of ridges 128 to provide structural strength to the shelf and a drain, which may be, for example and without limitation, one or more of apertures 127 that extend through shelf 121, and which may be, for example and without limitation, a plurality of holes or slots. In certain embodiments, insert 120 has a height, HB, a length. LS, that is less than LB and may be, for example and without limitation, LS=9 feet. 8 inches, and a width, WS, that is less than WB and may be, for example and without limitation, WS=of 7 feet, 4 inches. In certain embodiments, shelf 121 is a length, h, is 1 feet from bottom 118.

FIGS. 2 and 3 also illustrate an alternative embodiment comprising a transport trailer 130 which includes a frame 131, a trailer hitch 133, wheels 135, and a pivoted support edge 137 that is attached to bin 100 near the intersection of bottom 118 and side 115. Bin 100, including transport trailer 130, may be loaded with an agricultural product, such as grapes, and towed to a grape processing facility or winery.

In one embodiment, harvested grapes are provided though opening 111 onto shelf 121, as illustrated in FIG. 4A as a sectional view 2-2, such as view 2-2 of FIG. 1. During harvesting or placing the grapes in bin 100, some of grapes may be partially crushed, and thus the grapes include solids, S, (grape pulp) and liquids, L (grape juice), as illustrated in FIG. 4A. As illustrated in FIGS. 1, shelf 121 includes one or more apertures 127 that extend through shelf 121, and thus when the solids and liquids of the grapes contact the shelf liquids, L, pass through the shelf and flow to the container bottom 118, while solids, S, remain on the shelf, effectively separating the solids from liquids.

Figure 4B:
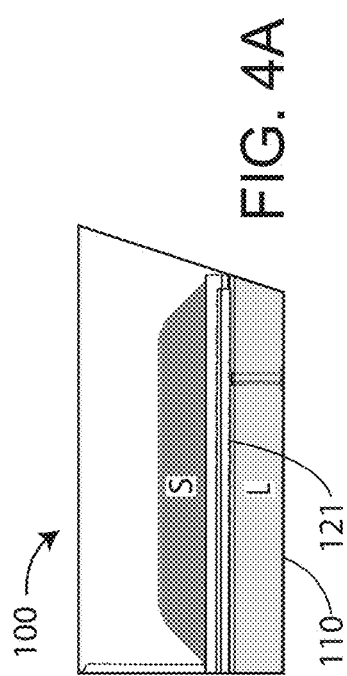
FIGS. 4B, 4C, and 4D, are views 2-2 showing the unloading of the grapes from the bin at sequential times.
Figure 4C:
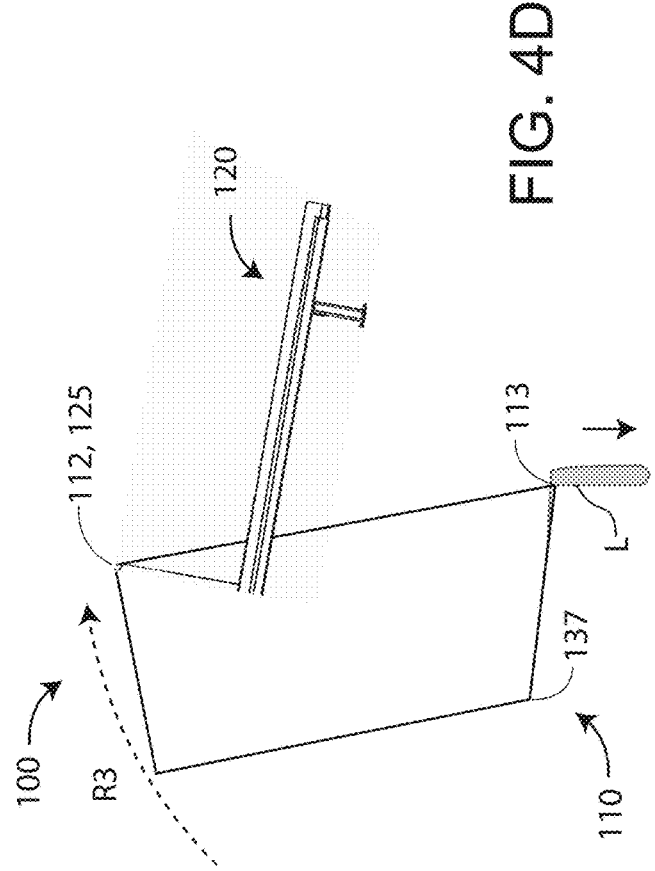
Figure 4D:
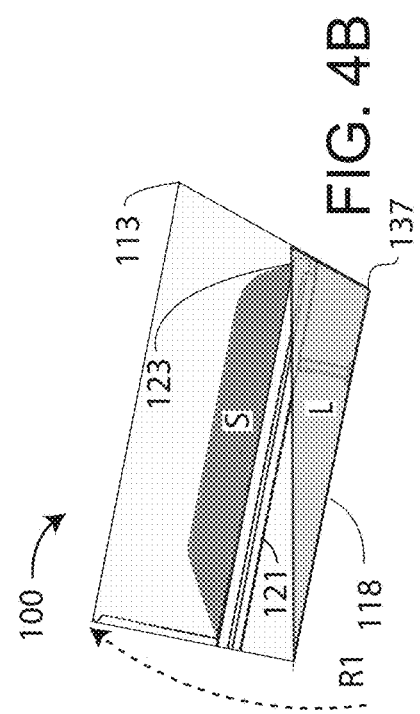

Bin 100 may be emptied of solids and liquids by rotating container 110 about an axis parallel to first container edge 112, such as pivoted support edge 137, as illustrated at sequential times in FIGS. 4B, 4C, and 4D, respectively. Since insert 120 is connected to at first container edge 112 of bin 110 by hinges 125, insert 120 may rotate separately from the bin, as described below.

As illustrated in FIG. 4B, container 110 is rotated a distance R1 from the configuration of FIG. 4A about support edge 137. Solids, S, remain on shelf 121 and move towards second edge 123 due to the rotation, and liquids, L, remain in container 110. Since the weight of solids, S, rest on insert 120, forcing insert 120 against bin 110, the insert initially rotates the same amount as does container 110.

As illustrated in FIG. 4C, container 110 is further rotated about support edge 137 by a distance R2 from the configuration of FIG. 4B. At this point, insert 120, rotates about hinge 125, causing the shelf 121 to rotate away from container bottom 118. Solids, S, move towards second edge 123, where they flow out of bin 100, as indicted by an arrow, A, while liquids, L, flow over container edge 113 and out of container 110.

As illustrated in FIG. 4D, container 110 is additionally rotated about support edge 137 by a distance R3 from the configuration of FIG. 4C. Any solids, S, remaining on shelf 121 will flow out of bin 110, as shown in FIG. 4C, and any liquids, L, remaining in container 110 will flow over container edge 113 and out of container 110. Bin 100 may be easily cleaned with the bin in the configuration of FIG. 4D Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. A method of separating juice from pulp using a bin, where the bin includes a container having a bottom and sides including a proximal side with a proximal top edge and a distal side with a distal top edge, and an opening defined, in part, by the proximal top edge and the distal top edge, and an insert including a shelf, where said insert extends from an proximal end to an distal end, said method comprising:
   providing juice and pulp to the shelf with said bin in the first configuration, where said shelf is rotatably attached to the container along an axis near said proximal top edge, where said bin in said first configuration includes said shelf within said container with said proximal end of said shelf adjacent to said proximal side of the container and with said distal end of said shelf adjacent to said distal side of the container, such that
      the provided pulp remains on the shelf, and
      the provided juice settles in the container at a location below the shelf; and
   unloading the bin by rotating the bin from said first configuration along the axis near said proximal top edge to the second configuration, such that the distal end of the shelf protrudes through the opening and such that the pulp on the shelf and the juice in the container exits through the opening of the container.

2. The method of claim 1, where, in the first configuration, the shelf is maintained at a height above the bottom of the container, and includes one or more apertures through the shelf, such that the provided juice flows through the one or more apertures through the shelf to a location in the container below the shelf.

3. The method of claim 1, where, in the second configuration, the insert including the shelf rotates in a direction towards said opening.

4. The method of claim 1, where the bin includes a hinge rotatably connecting the insert and the container, and where said rotating and further rotating includes rotating the insert about the hinge.

5. The method of claim 4, where said one or more apertures include a plurality of openings through said shelf.

6. The method of claim 1, where said shelf includes a plurality of legs that extend from the shelf, and where, in the first configuration, the legs extend from the shelf to the bottom.

7. The method of claim 1, where said providing juice and pulp to the shelf occurs at the location of a grape harvest.

* * * * *